United States Patent [19]

McGlynn et al.

[11] Patent Number: 5,229,538
[45] Date of Patent: Jul. 20, 1993

[54] MULTIPLE SMART WEAPONS EMPLOYMENT MECHANISM

[75] Inventors: Maureen P. McGlynn, Huntingdon Valley; William D. Meiklejohn, Warminster, both of Pa.

[73] Assignee: M. Technologies, Inc., Huntingdon Valley, Pa.

[21] Appl. No.: 901,229

[22] Filed: Jun. 19, 1992

[51] Int. Cl.$^5$ .......................... B64D 1/04; F41F 3/06
[52] U.S. Cl. ...................................... 89/1.56; 102/206
[58] Field of Search ................... 89/1.56, 1.51, 1.819; 102/206; 324/158 R

[56] References Cited

U.S. PATENT DOCUMENTS

| | | | |
|---|---|---|---|
| 3,779,129 | 12/1973 | Lauro | 89/1.56 |
| 3,803,974 | 4/1974 | Everest et al. | 340/163 |
| 4,494,438 | 1/1985 | Lighton et al. | 89/1.56 |
| 4,660,456 | 4/1987 | Griffin et al. | 89/1.56 |
| 4,697,764 | 10/1987 | Hardy et al. | 89/1.51 |
| 4,825,151 | 4/1989 | Aspelin | 89/1.56 |
| 5,034,686 | 7/1991 | Aspelin | 102/206 |
| 5,148,734 | 9/1992 | Lilly | 89/1.819 |

*Primary Examiner*—David H. Brown
*Attorney, Agent, or Firm*—Gregory J. Gore

[57] ABSTRACT

A digital communication network adapts a conventional MIL-STD-1553 aircraft multiple weapons rack for carriage of smart weapons. The network is a communications, power, and signal management interface circuit which permits an existing single pylon wing RT/sub-bus to control a plurality of additional smart RT's. The network utilizes a sub-bus which includes an RT and a bus controller for the multiple stores. The output of the RT/sub-bus is divided to create a plurality of inputs to the additional RT's to establish a power and communications link with the aircraft controller. The network includes a processor which receives coded digital communications from the controller and selectively rebroadcasts those communications to one of the smart weapons on the rack designated by the coded communication. The messages received from the aircraft controller are translated into assembly language and are deciphered to either operate input/output functions or to be reconfigured into MIL-STD-1553 messages between the bus controller and the stores, or between the remote terminal and the aircraft. All operating functions of the smart weapons can be controlled from the aircraft without any physical changes to the aircraft or the weapons rack and with only minimal changes to the aircraft operational flight program.

11 Claims, 12 Drawing Sheets

1553 NETWORK
BASIC ARCHITECTURE

FIG. 8 AIRCRAFT TO STORE TRANSFERS (RECEIVE)

| STEP | AIRCRAFT T/R | MESSAGE | DIR | MSWEM | T/R | DIR | MESSAGE | STORE |
|------|---|---|---|---|---|---|---|---|
| 1 | R | MCM S11 WD27 MS ADD & CNT MSWEM SW | ↓ | | | | | |
| 2 | R | MSG 1, SUB A MSWEM SW | ↓↓ | | | | | |
| 3 | | | ↓↓ | | R | ↓↓ | MSG 1, SUB A STORE SW | MSG 1 DATA |
| 4 | R | MSG 2, SUB B MSWEM SW | ↓↓ | | | | | |
| 5 | | | ↓↓ | | R | ↓↓ | MSG 2, SUB B STORE SW | MSG 2 DATA |
| 6 | R | MSG 3, SUB C MSWEM SW | ↓↓ | | | | | |
| 7 | | | ↓↓ | | R | ↓↓ | MSG 3, SUB C STORE SW | MSG 3 DATA |
| 8 | T | MODE CODE 10 (TRANS SW) MSWEM SW | ↓↓ | | | | | |

FIG. 9 STORE TO AIRCRAFT TRANSFERS (TRANSMIT)

| STEP | AIRCRAFT | T/R | MESSAGE | DIR | MSMEM | T/R | DIR | MESSAGE | STORE |
|---|---|---|---|---|---|---|---|---|---|
| 1 | | R | MCM S11 WD27 MS ADD & CNT MSMEM SW | ← | | | | | |
| 2 | | T | MSG 1, SUB A MSMEM SW + ZERO DATA | → | | | | | |
| 3 | | | | ← | | T | ← | MSG 1, SUB A STORE SW + MSG 1 DATA | |
| 4 | MSG 1 DATA | | | → | | | → | | |
| 5 | | T | MSG 2, SUB A MSMEM SW + MSG 1 DATA | → | | T | ← | MSG 2, SUB A STORE SW + MSG 2 DATA | |
| 6 | MSG 2 DATA | | | → | | | → | | |
| 7 | | T | MSG 3, SUB A MSMEM SW + MSG 2 DATA | → | | T | ← | MSG 3, SUB A STORE SW + MSG 3 DATA | |
| 8 | MSG 3 DATA | T | MSG 4, SUB A MSMEM SW + MSG 3 DATA | → | | | → | | |

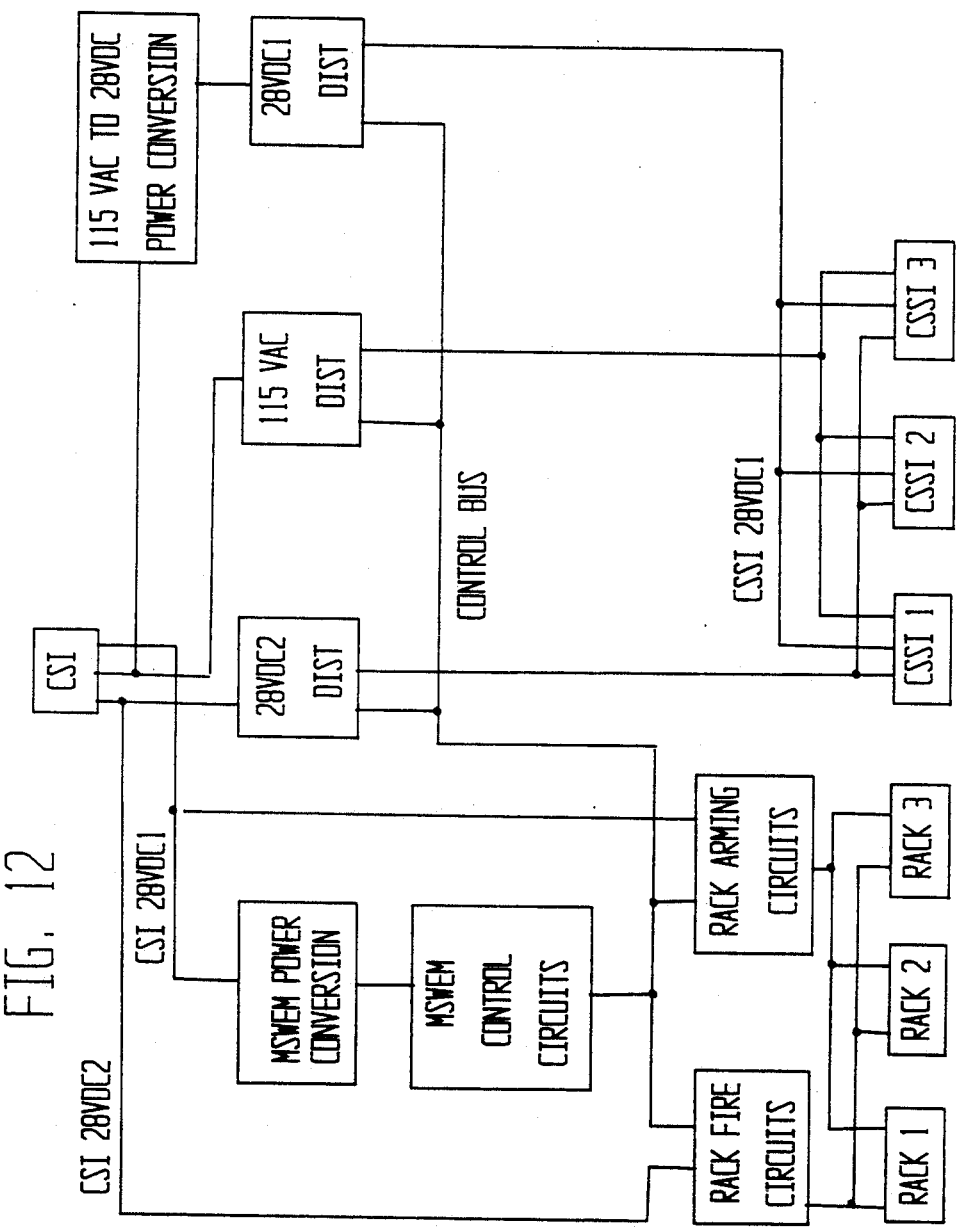
FIG. 12  POWER DISTRIBUTION SYSTEM

MULTIPLE SMART WEAPONS EMPLOYMENT MECHANISM

FIELD OF THE INVENTION

The present invention relates to control and release of in-flight programmable "smart" weapons, as well as conventional weapons from aircraft. More specifically, the invention provides digital control and monitoring of: 1) Ejector Units; 2) MIL-STD-1760 signals and discrete circuits; and 3) communication to weapons containing a remote terminal, such as a system complying with MIL-STD-1553.

BACKGROUND OF THE INVENTION AND DESCRIPTION OF THE PRIOR ART

Two classes of weapon systems are related to this invention; in-flight programmable "smart" weapons and conventional "dumb" weapons, such as gravity iron bombs. Smart weapons are currently carried on modern military aircraft in a single weapon configuration, i.e. one weapon per aircraft weapon station (wing pylon). A second configuration is multiple carriage. In this configuration, multiple weapons are carried at each aircraft weapon station. The multiple carriage configuration is facilitated by a Multiple Carriage Rack (MCR). The MCR provides suspension and release equipment (S&RE) for a plurality of weapons. In the case of three weapons, the MCR may be referred to as a TER (Triple Ejector Rack). Release of weapons from an MCR is controlled by signals at the wing pylon (store station equipment) which are directly wired to the ejection units on the MCR. The signals at the wing pylon originate from the aircraft controller as a result of pilot or aircrew action. At present, MCR's have no digital capability; therefore, they are capable of carrying and releasing only "dumb" bombs. This greatly reduces the smart weapon delivery capabilities of the aircraft, thus reducing overall mission effectiveness.

Broad interchangeability of weapon systems is a major design goal for modern military aircraft. To this end, MIL-STD-1760, entitled Military Standard-Aircraft/Store Electrical Interconnection System, was developed. This standard identifies the electrical interface between compliant aircraft and compliant stores. The electrical interfaces are referred to as a signal set, which is passed through a "1760" connector. FIG. 1 shows a diagram of the electrical interfaces between the aircraft and the stores. The part of the connector which is located on the aircraft is referred to as the Aircraft Store Interface (ASI). The interfaces between the carriage store and the mission stores are referred to as the CSI and CSSI respectively. The part of the connector on the weapon (mission store) is referred to as the Mission Store Interface (MSI). "1760" stores are considered smart weapons. In order to be MIL-STD-1760 compliant, the aircraft must be capable of supplying all of the 1760 signals, while stores may implement a subset of these signals.

A computer within the aircraft, referred to here as the "aircraft controller", is responsive to pilot or aircrew commands and communicates with each weapon system to monitor status, perform launch preparation, and execute launch commands. Each weapon system has its own requirements for use. Conventional "dumb" bombs require only basic control and monitoring while smart weapons require various inputs for status monitoring, targeting, arming, and ejecting. Most smart weapons systems contain a Remote Terminal (RT) which enables them to receive information and instructions from the aircraft controller. In addition, the weapon system is able to report its status to the aircraft controller through the RT.

In modern military aircraft, the aircraft controller is connected to smart weapon systems with a data bus as described in MIL-STD-1553, entitled Military Standard-Aircraft Internal Time Division Command/Response Multiplex Data Bus, which is hereby incorporated by reference herein. This dual-redundant bus is comprised of two shielded twisted-pair cables, a bus controller and a variable number of remote terminals (1 to 31).

The above description of the prior art can be further explained by reference to FIGS. 2 and 3 which show how the standard 1553 armament network is configured. FIG. 2 is a simplistic view of a 1553 Armament Bus on an aircraft. This is only a partial drawing of the armament network. A complete drawing would show the bus continuing out to the stations on the aircraft's right wing. The Bus Controller (BC), which is connected to the Storage Management System computer, can communicate with a Remote Terminal (RT) in any one of the stores connected to the wing pylon. Note that with this configuration, only one 1760 weapon can be hung on each pylon station. FIG. 3 is a block diagram of the 1553 Armament Network pictured in FIG. 2. In the past, controlling multiple smart weapons from a single rack has been sought, however, a fully operational and practical system has never before achieved.

The most pertinent patent prior art of which the applicant is aware includes U.S. Pat. No. 5,034,686. This reference describes a Weapon Interface System "WIS" which is referred to here as the aircraft weapon station or weapon pylon. The present invention interfaces with this weapon station where a weapon would normally be placed. This reference includes a thorough description of modern aircraft weapons management systems and is hereby incorporated by reference as though fully set forth herein.

Other prior art patent references pertinent to the present invention of which the applicant is aware includes U.S. Pat. No. 3,803,974, entitled "Fire Control System", issued to Everest et al; U.S. Pat. No. 3,779,129, entitled "Electrical Monitoring and Management System for Airborne Ordinance", issued to Lauro; and U.S. Pat. No. 4,494,438, entitled "Air-to-Air Weapon Modification for Military Aircraft", issued to Lighton et al. While each of these references is pertinent in that it shows a device applicable to modern aircraft weapon systems, none anticipates nor is suggestive of the present invention, nor are any of these references capable of the results achieved by the present invention.

SUMMARY OF THE INVENTION

The present invention is a digital communications armament network which adapts a conventional 1553 aircraft multiple weapons rack for carriage of smart weapons and has been given the acronym MSWEM (for Multiple Smart Weapons Employment Mechanism). It allows multiple carriage of smart weapons by adapting to the existing control system without making physical changes to the aircraft or the existing multiple carriage rack. This device also requires only minimum modifications to the existing aircraft operational flight program. The obvious main advantage of the present invention is that it allows for the carriage and management of a greater number of smart weapons per aircraft than would otherwise be possible.

As further described, the MSWEM is a communications, power, and signal management interface circuit which permits an existing single pylon wing RT/sub-bus to control a plurality of additional smart RT's. FIG. 4 shows an aircraft 1 with an MCR 3 attached to one of the wing pylons 5. FIG. 5 is a more detailed drawing of the wing stations shown in FIG. 4. It shows the MSWEM RT and bus controller which has been incorporated into the MCR. This MSWEM sub-bus includes an RT and a bus controller for the multiple stores. This configuration (a TER) would allow three (3) 1760 weapons to be hung on a single pylon station. FIG. 6 is a block diagram of the network architecture of the armament system incorporating the 1760 MCR. The output of the RT/sub-bus is divided to create a plurality of inputs to the new MCR RT's to establish a power and communications link with the aircraft controller. This is facilitated through a modification of the operational flight program wherein data words within the 1553 communications message format are coded to control the transfer of data to the designated weapon by the MSWEM microprocessor. Bits within this message contain the new RT address of the store that is to be communicated with (A, B or C within a triple ejector rack). The other MSWEM messages that control and monitor MSWEM 1760 discrete circuits and rack functions are designed to match as closely as possible the store control and monitor messages currently defined in MIL-STD-1760. The store control/monitor messages are unchanged so that the MSWEM interface appears transparent to the aircraft controller once the modification to the operational flight program has been made.

In this way, the communications transfer is established by receiving coded communications from the flight controller and rebroadcasting functionally identical data to each code-designated RT on the MCR. Similarly, data flow from the stores to the aircraft are received and rebroadcast by the MSWEM. This permits the various stores on the MCR to communicate with the aircraft through a single pylon RT. Greater detail of the MSWEM data processing is provided in the description of the preferred embodiment below.

It is, therefore, the principal object of this invention to provide multiple carriage of smart weapons on a single aircraft weapon station. Or, put more succinctly, to create a 1760 MCR. This has been achieved by adding to existing aircraft hardware a data network electronics package which comprises a microprocessor-controlled, electromechanical device for the distribution of various signals and power. As further described herein, this system is capable of controlling the release of multiple in-flight or ground programmable devices.

Other objects of this invention are: 1) to provide multiple carriage capability without making physical changes to the aircraft or existing multiple carriage rack; 2) to require minimal modifications to the aircraft Operational Flight Program (OFP); 3) provide the distribution of bidirectional amplified high bandwidth signals to multiple stores simultaneously without increasing the output requirements from the aircraft; 4) provide control and monitor of suspension and release equipment for multiple weapons through data messages; 5) transmit data messages received on a single RT address to multiple remote terminals with minimal delay; 6) provide power conversion and distribution so that multiple stores may be powered simultaneously without increasing the aircraft power output requirements; 7) provide for the distribution of fiber optic signals from one input to multiple outputs; and finally, 8) achieve these objects without affecting the release characteristics of the weapons.

These objects have been achieved by a digital communications armament network adaptor for carrying multiple smart weapons on a single wing pylon station of an aircraft, comprising: an aircraft having a weapons controller configured in compliance with MIL-STD 1553; multiple wing-mounted pylons on the aircraft, each providing a weapons station with communications and ejection and release mechanisms electrically connected to the controller for the airborne launch of smart weapons; a multiple ejector rack affixed to at least one pylon, the rack holding a plurality of smart weapons; and an electronic digital network connected between the controller and the rack-mounted smart weapons, the network located in the rack and including circuitry which receives coded digital communications from the controller and selectively rebroadcasts the communications to one of the smart weapons on the rack designated by coded communications, thereby controlling all required functions of the designated smart weapon.

The microprocessor receives signals from the weapons and selectively rebroadcasts them to the controller which includes an operational flight program having a network control message to control the flow of data to and from a designated smart weapon on the multiple ejector rack. The network circuitry comprises three major components: a remote terminal which communicates with the aircraft over the aircraft bus, and a bus controller which communicates with the stores over the store bus; a processor, which includes a central processor unit and address decode control logic to control MIL-STD-1553 communications between the remote terminal and the bus controller; and, an input/output stage which is controlled via aircraft bus communications to the remote terminal which is acted upon by the processor to control discrete functions of the rack and weapons. The messages received from the aircraft controller are translated into assembly language and are deciphered to either operate input/output functions or to be reconfigured into MIL-STD-1553 messages between the bus controller and the stores, or between the remote terminal and the aircraft.

Other objects, advantages, and novel features of the invention will become apparent with the following detailed description of the invention when considered in conjunction with the accompanying drawings.

BRIEF DESCRIPTION OF THE DRAWINGS

FIG. 8 is a chart showing message transfers between the aircraft and the stores.

FIG. 9 is a chart showing message transfers from the stores to the aircraft.

FIG. 12 is a block diagram showing the power distribution system which permits multiple stores to be powered simultaneously from the existing aircraft power source.

GLOSSARY OF TERMS

This discussion of the invention relies heavily on the use of acronyms as is customary when describing military aircraft systems. The acronyms used in the following text are defined as follows:
EUs—Ejector Units
MCR—Multiple Carriage Rack
S&RE—Suspension and Release Equipment
TER—Triple Ejector Rack
ASI—Aircraft Store Interface
MSI—Mission Store Interface
RT—Remote Terminal
BC—Bus Controller
553—in compliance with Military Standard 1553
760—in compliance with Military Standard 1760
MSWEM—Multiple Smart Weapons Employment Mechanism (the present invention)
OFP—Operational Flight Program
SMS—Stores Management System
MCM—MSWEM Control Message
MACM—MSWEM Auxiliary Command Message
MACMM—MSWEM Auxiliary Command Monitor Message
CS—Carriage Store
MS—Mission Store
CSI—Carriage Store Interface
CSSI—Carriage Store Station Interface
GPS—Global Positioning System
MMIC—Monolithic Microwave Integrated Circuit
MSMC—Mission Store Message Count

DESCRIPTION OF THE PREFERRED EMBODIMENT

Figure 1:
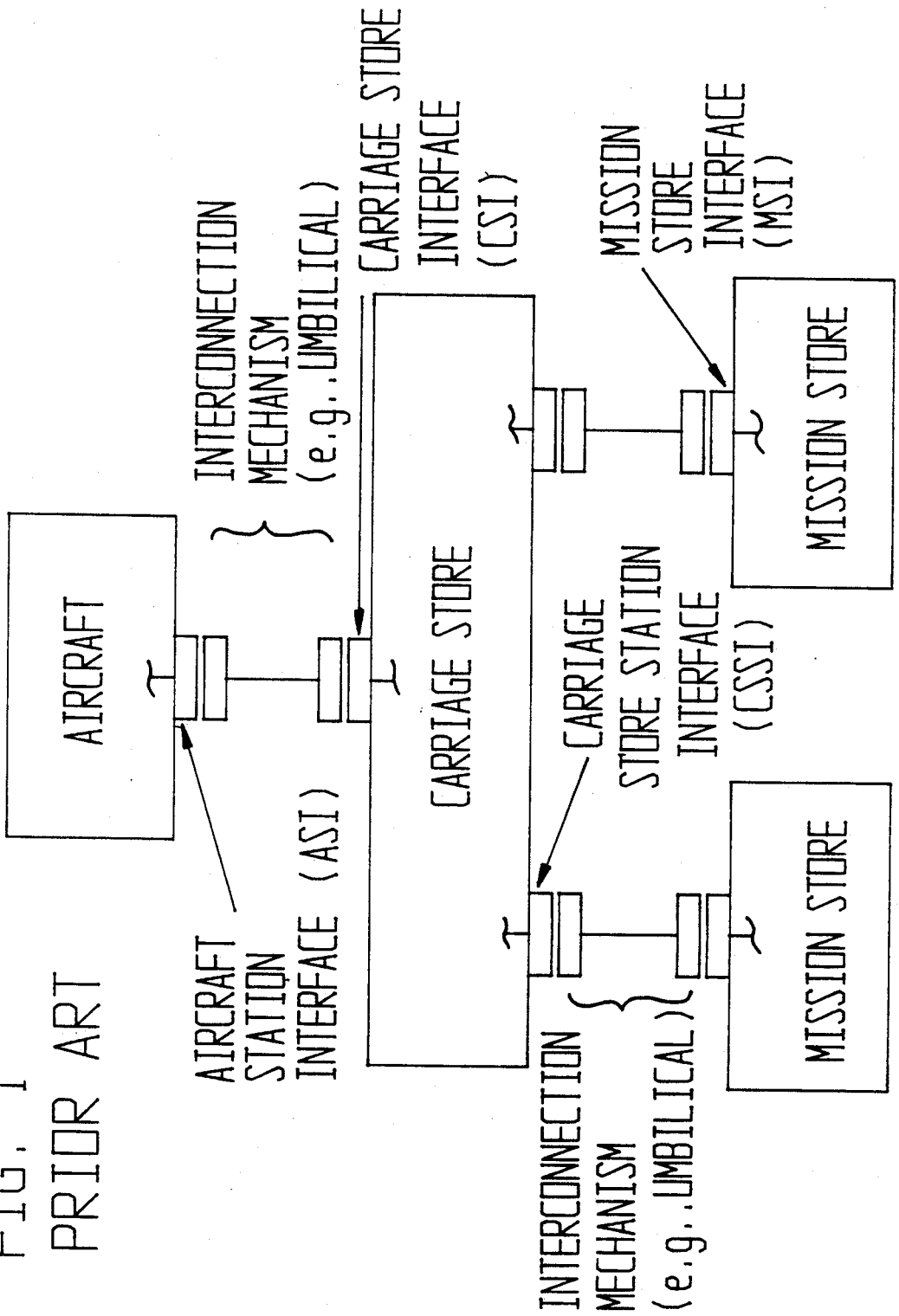
FIG. 1 is a prior art diagram showing standard carriage of mission stores at an aircraft station.
Figure 2:
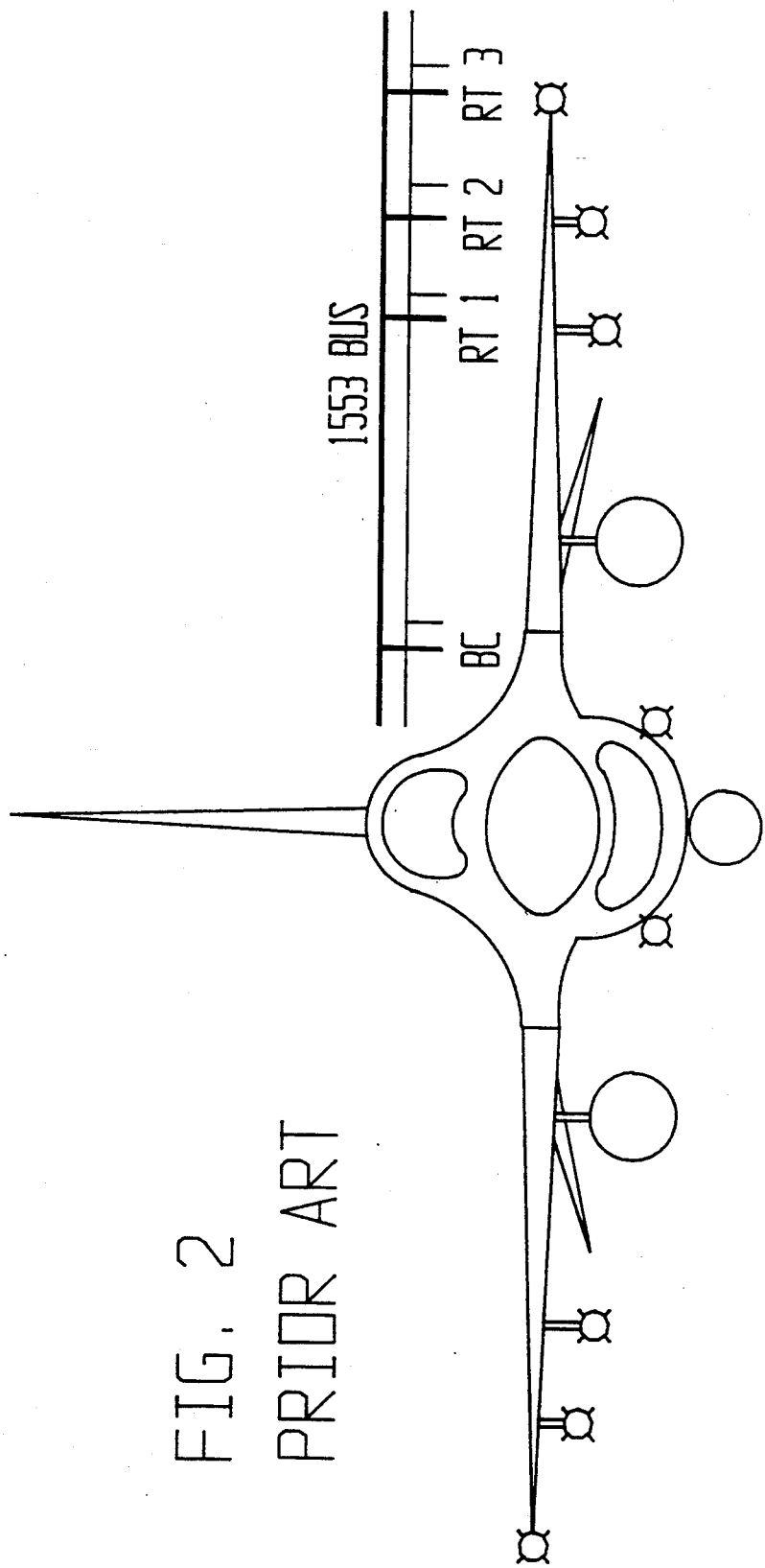
FIG. 2 is a prior art diagram which shows an aircraft with a bus controller carried out to three weapons stations.
Figure 3:
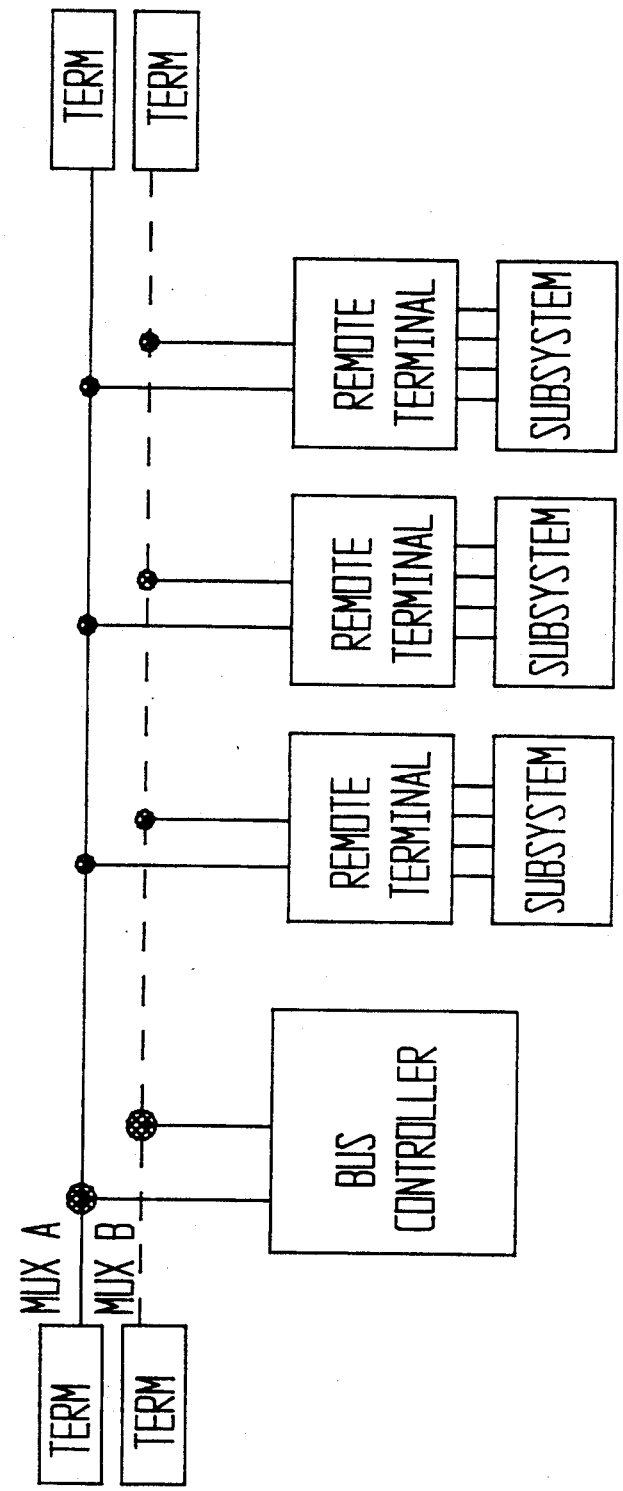
FIG. 3 is a prior art block diagram showing the basic 1553 network architecture.
Figure 4:
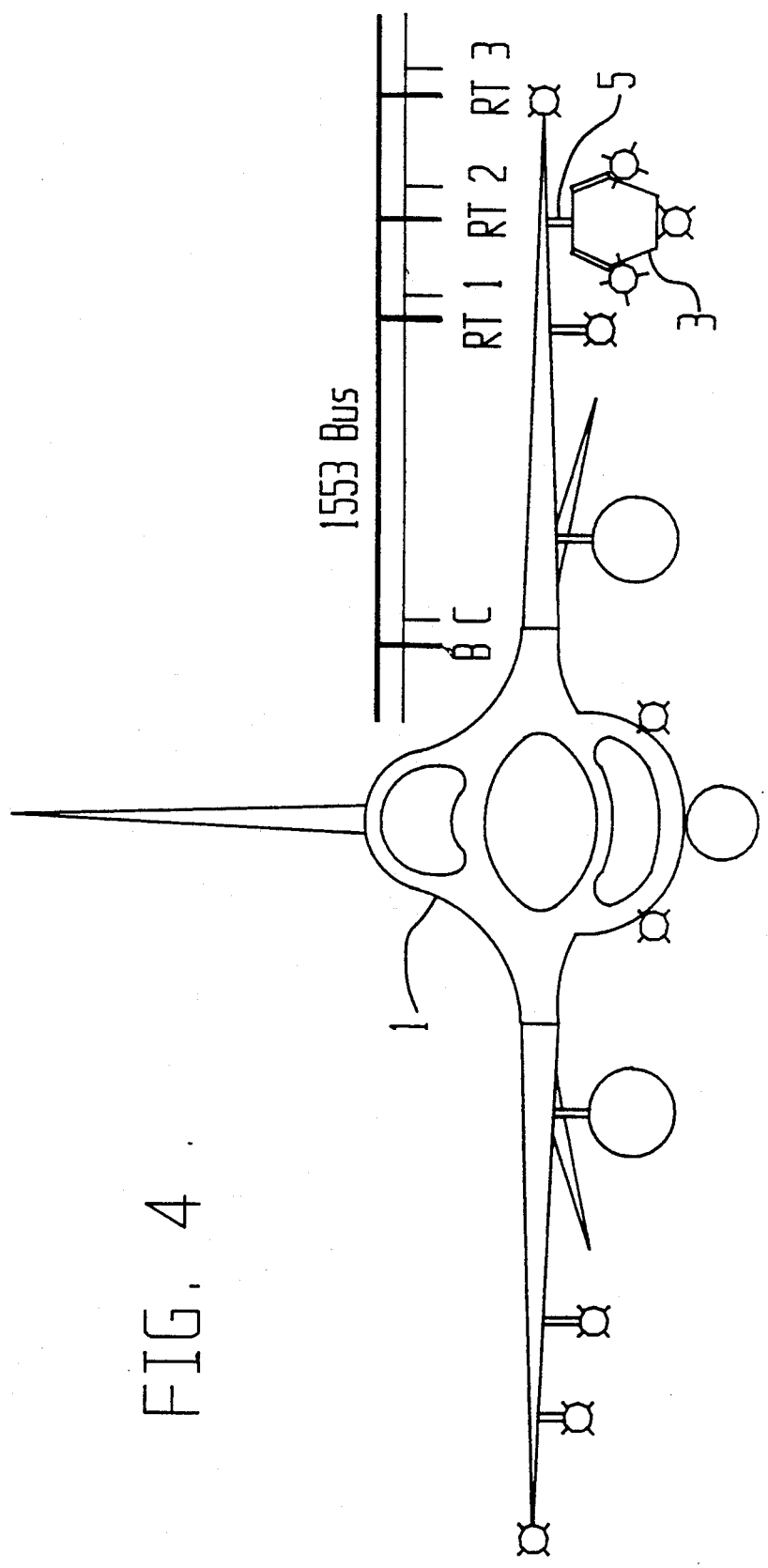
FIG. 4 is a diagram which shows a multiple carriage rack connected directly to an aircraft pylon.
Figure 5:
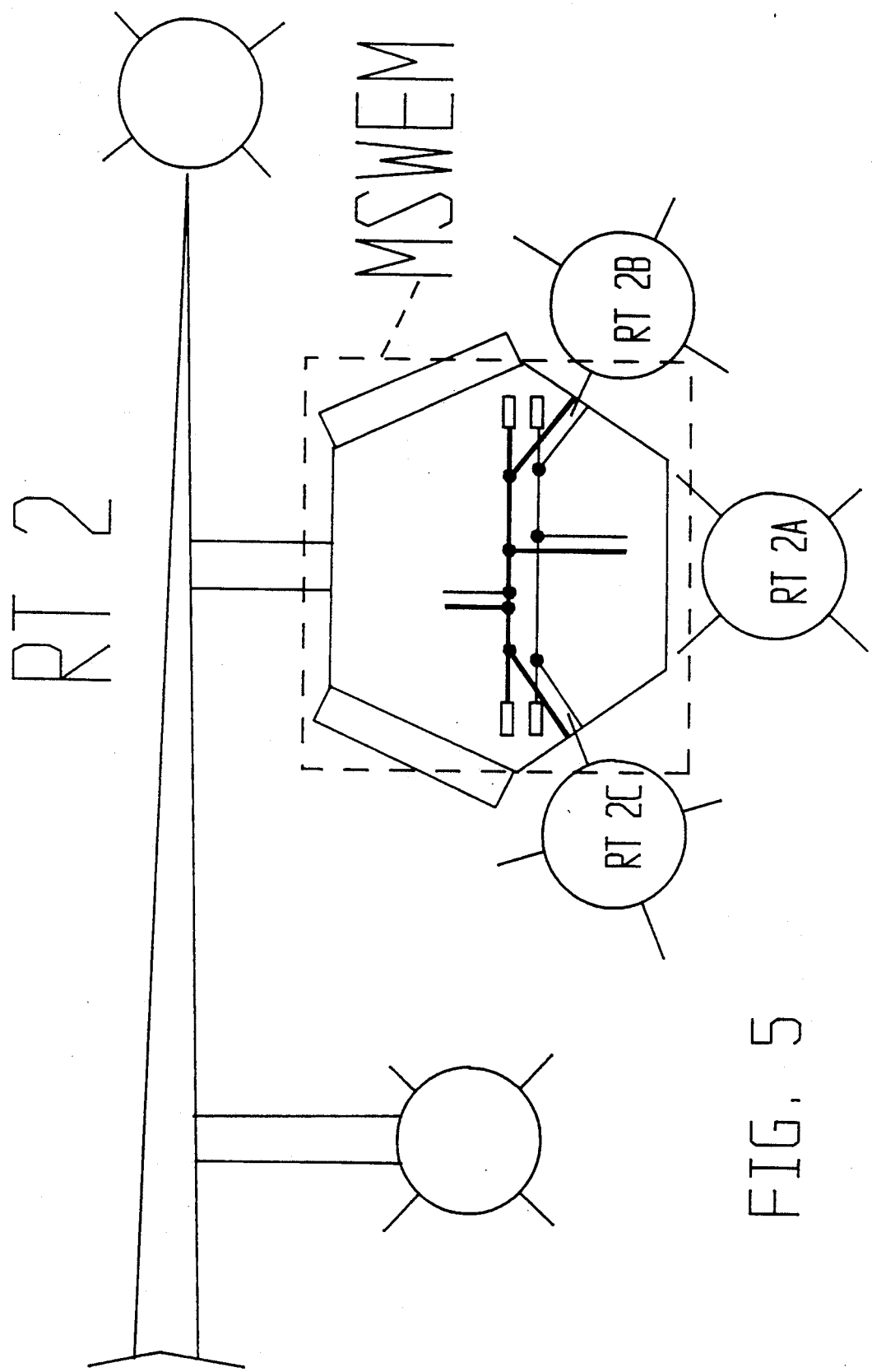
FIG. 5 is a diagram of a triple ejector rack shown in FIG. 4 showing the incorporation of the present invention which controls smart weapons 2A, 2B and 2C at aircraft wing pylon remote terminal 2.
Figure 6:
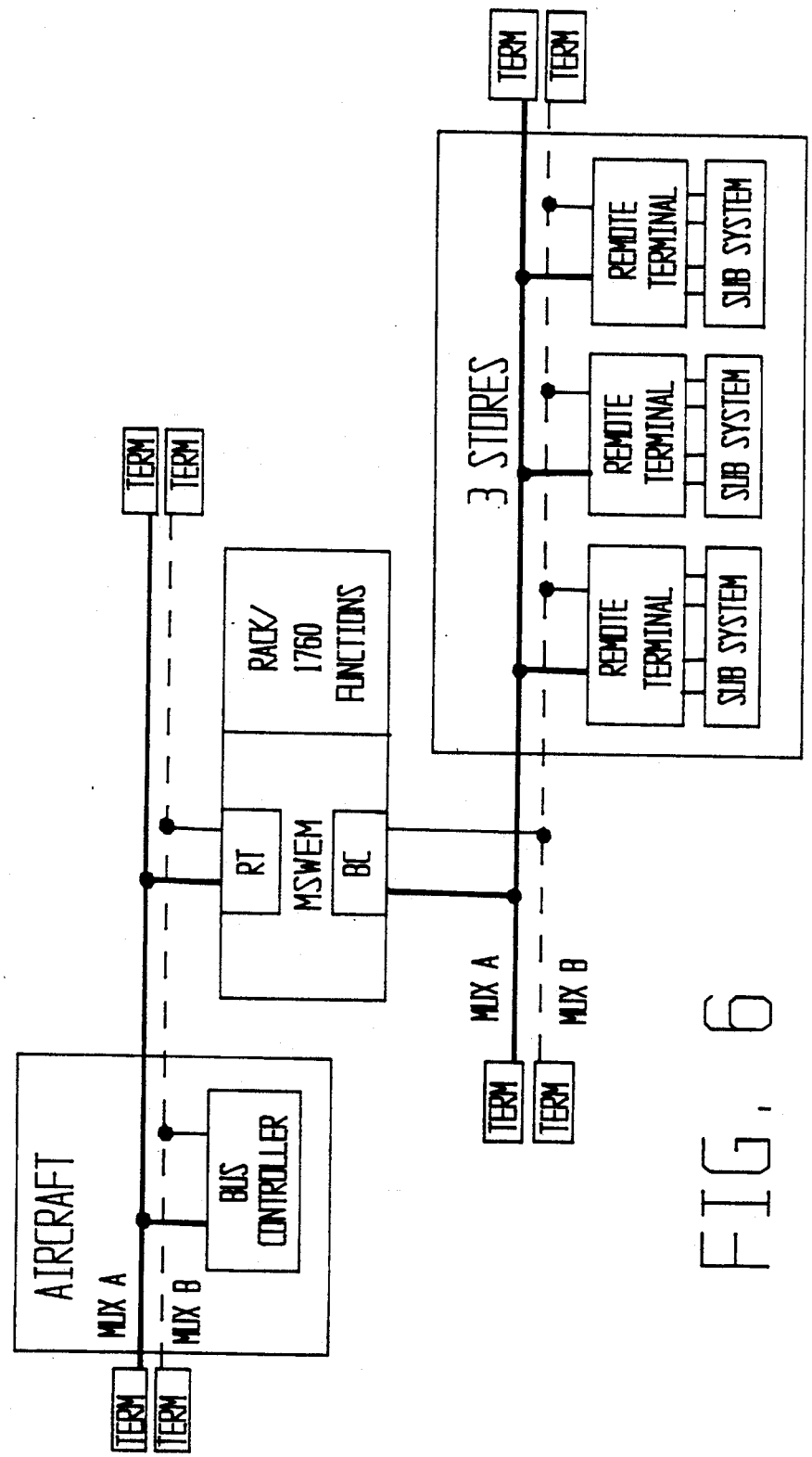
FIG. 6 is a block diagram showing the interconnection of the present invention at one remote terminal interconnecting the aircraft with three stores.

As described above, the preferred embodiment provides for multiple carriage of smart weapons on a single aircraft station. This electronic interface package includes the following components: a remote terminal/bus controller subsystem; a microprocessor; operating system software; 1760 discrete circuits; and a power conversion device. In the preferred embodiment, the MSWEM circuitry has been packaged into a TER-9A (U.S. Air Force triple ejector rack) extrusion without making any physical changes to the strong back. No physical changes are required to be made on the aircraft. As described below, only minimal changes are required to the aircraft's operational flight program (OFP). As seen in FIG. 6, the MSWEM has an RT and BC contained within it. The MSWEM BC can communicate with up to 31 RT's through one RT address on the main armament bus. In a TER application, it will be connected to as many as 3 RT's, each communicating with a 1760 store. The RT addresses on the MSWEM sub-bus are fixed by store station position on the MCR. When looking forward from the back of the MCR, RT (2A) is the center position, RT (2C) is on the left, and RT (2B) is on the right of the MCR. With these addresses on the MCR fixed in this manner, it is possible to hang the MCR on any one of the wing pylons without additional changes to hardware or software. That is, once the aircraft software is modified to handle the 1760 MCR, the MCR's are non-station specific. In addition, numerous 1760 MCR's can be hung on a single aircraft.

Figure 7:
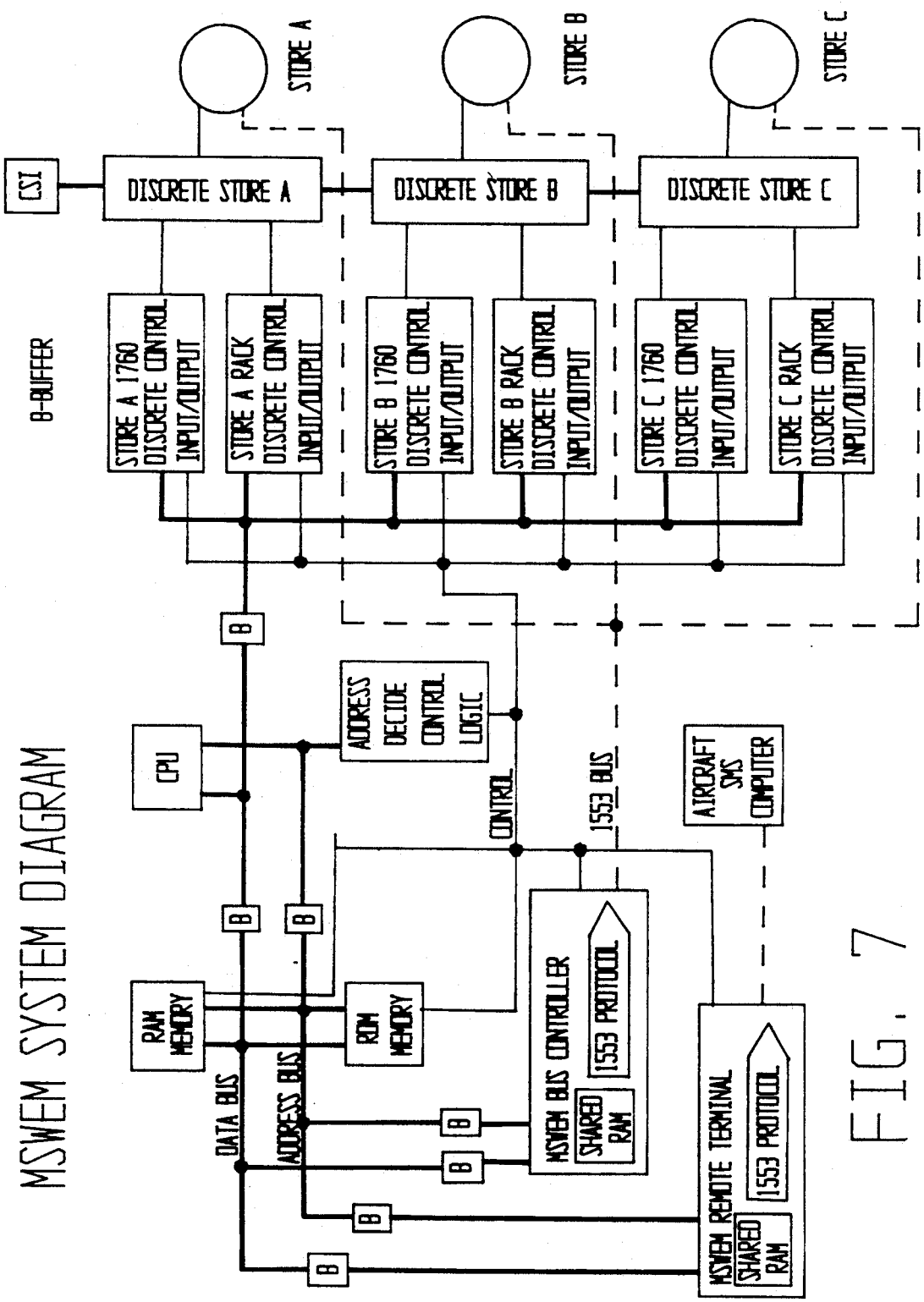
FIG. 7 is a block diagram showing the various functional components of the MSWEM system.

FIG. 7 diagrammatically shows operational components of the MSWEM system and how they are interconnected. Referring now to FIG. 7, the MSWEM circuitry can be divided into three functional components. These functional areas are the Remote Terminal (RT) and Bus controller (BC), the processor, and the input/output (I/O) stage with discrete circuits. The RT receives MIL-STD-1553 messages over the aircraft bus. These messages are translated by the processor into assembly language. The assembly language code is then deciphered and a determination is made to operate the I/O or reconfigure messages into appropriate MIL-STD-1553 format for communications between the BC and store A, B and/or C, or between the RT and the aircraft.

The RT and BC are responsible for the communications over the data busses. The RT communicates with the aircraft over the aircraft bus. The BC communicates with the stores over the stores bus. All MIL-STD-1553 communications to and from the MSWEM are controlled via these two components. The TER-9A uses two MIL-STD-1553 hybrids for the BC and RT. These particular components have shared RAM and the MIL-STD-1553 protocol in a hybrid package.

A second functional area within the MSWEM is the processor. In FIG. 7, the processor is made up of the following:
Central Processor Unit (CPU)
RAM
ROM
Address Decode Control Logic
Buffers
Address Bus
Data Bus The processor is an Intel 80286 microprocessor that will execute a preprogrammed routine (MSWEM Operating System Software) developed in assembly language and burned into the ROM chips. This program controls the usage of RAM, the address decode logic and the buffers to assure that the processor is functioning properly. The internal data is transmitted over the data bus and the direction/destination of the data is controlled by addresses that enable specific chips.

The specific functions of the processor component is to evaluate the communications coming from the RT and determine what action to take based upon that input. The processor can perform the following:
MSWEM initialization
MIL-STD-1553 communications between the BC and RT
Receive data from the RT to monitor and/or control rack functions
Receive data from the RT to monitor and/or control store functions The third area is the input/out (I/O) stage. The I/O is controlled via aircraft bus communications to the RT which is acted upon by the processor to control discrete functions. The discrete function controls are performed by individual signal inputs and outputs from the processor to the stores and racks. These signals turn on/turn off switches (transistors and relays) that control the path that the aircraft power and discrete signals are routed to the store or rack function required. Similarly, some of the signals from the rack and store to the processor provide a status of the stores and ejector racks current state (ON/OFF).

The incorporation of a MIL-STD-1760 Multiple Carriage Rack (MCR) into an aircraft's armament system utilizing the present MSWEM invention requires software modifications to the Stores Management System (SMS) portion of the aircraft's Operational Flight Program (OFP). Changes are required in the SMS to control the 1760 discrete circuits and rack functions in the MCR and to communicate 1553 messages through the additional hardware to stores below. To accomplish this, two control messages and several control words must be added to the SMS's vocabulary. The SMS will be required to implement and transmit these new messages to a designated store, but rebroadcast without the message coding, and thus will be transparent to the stores. In addition to the two control messages, several words must be added to the vocabulary of the SMS. The additional control messages are: 1) the MSWEM Control Message (MCM); and 2) the MSWEM Auxiliary Command Message (MACM). Both the control messages and words have matching monitor words in order to properly monitor the performance of the 1760 MCR.

The MSWEM messages and words shown in the following charts enable the MSWEM to transmit data to a designated store in a format which will be transparent to the stores.

MESSAGE FORMATS

| MESSAGE NAME | MSWEM CONTROL MESSAGE (MCM) | | |
|---|---|---|---|
| SUBADDRESS | 11 | | |
| WORD NUMBER | WORD NAME | CONTENT | WORD DESCRIPTION |
| 0 | COMMAND WORD | RECEIVE | |
| 1 | HEADER | MESSAGE IDENTIFIER (0500) | (SEE NOTE A) |
| 2 | VALIDITY | WORDS 1 TO 16 VALIDITY | |
| 3 | VALIDITY | WORDS 17 TO 29 VALIDITY | |
| 4 | CRITICAL CONTROL | IDENTIFIER BITS ID DESTINATION OF THIS MESSAGE | (SEE NOTE 2) |
| 5 | CRITICAL AUTHORITY | POLYNOMIAL USED TO CHECK MESSAGE, REFLECTS WORD 4 | |
| 6 | ZERO FILLED | | |
| 7 | ZERO FILLED | | |
| 8 | CSSI 1 RACK CONTROL | | |
| 9 | CSSI 2 RACK CONTROL | | |
| 10 | CSSI 3 RACK CONTROL | | |
| 11 | ZERO FILLED | | |
| 12 | ZERO FILLED | | |
| 13 | ZERO FILLED | | |
| 14 | ZERO FILLED | | |
| 15 | ZERO FILLED | | |
| 16 | CSSI 1 1760 CONTROL | | |
| 17 | CSSI 2 1760 CONTROL | | |
| 18 | CSSI 3 1760 CONTROL | | |
| 19 | ZERO FILLED | | |
| 20 | ZERO FILLED | | |
| 21 | ZERO FILLED | | |
| 22 | ZERO FILLED | | |
| 23 | ZERO FILLED | | |
| 24 | ZERO FILLED | | |
| 25 | ZERO FILLED | | |
| 26 | PERFORM INTERRUPTIVE BIT | | |
| 27 | CS/MS DATA TRANSFER | | (SEE NOTE C) |
| 28 | MSWEM CONFIGURATION CONTROL WORD | | |
| 29 | ZERO FILLED | | |
| LAST | CHECKSUM | | |

MESSAGE

NOTES:

A) 0501 WILL BE THE HEADER WORD FOR ALL CARRIAGE STORE CONTROL MESSAGES

B) WHEN THE MESSAGE IS CONTROLLING CARRIAGE STORE FUNCTIONS THE DESIGNATOR BITS WILL BE SET TO CS "010"

WHEN THE MESSAGE IS INTENDED TO GO TO A MISSION STORE THE DESIGNATOR BITS WILL BE SET TO MS "001"

IF IN THE MIDDLE OF A SEQUENCE OF MESSAGES TO THE MISSION STORE, THE DESIGNATORS ARE SET TO CS "010" THE DATA TRANSFER SEQUENCE WILL BE TERMINATED

C) THIS WORD CONTAINS THE CSSI ADDRESS, AND THE NUMBER OF MESSAGES IN THE TRANSFER

DEFINITION WORD 27
BITS 1-5 CSSI ADDRESS
BITS 6,7 & 8 TBD
BITS 9-16 NUMBER OF MESSAGES
IN XFER (UP TO 256)

MESSAGE FORMATS

| MESSAGE NAME | MSWEM MONITOR MESSAGE (MMM) |
|---|---|
| SUBADDRESS | 11 |

| WORD NUMBER | WORD NAME | CONTENT | WORD DESCRIPTION |
|---|---|---|---|
| 0 | COMMAND WORD | TRANSMIT | |
| 1 | HEADER | MESSAGE IDENTIFIER (0501) | |
| 2 | VALIDITY | WORDS 1 TO 16 VALIDITY | |
| 3 | VALIDITY | WORDS 17 TO 29 VALIDITY | |
| 4 | CRITICAL CONTROL MONITOR | | |
| 5 | CRITICAL AUTHORITY MONITOR | | |
| 6 | ZERO FILLED | | |
| 7 | ZERO FILLED | | |
| 8 | CSSI 1 RACK MONITOR | | |
| 9 | CSSI 2 RACK MONITOR | | |
| 10 | CSSI 3 RACK MONITOR | | |
| 11 | ZERO FILLED | | |
| 12 | ZERO FILLED | | |
| 13 | ZERO FILLED | | |
| 14 | ZERO FILLED | | |
| 15 | ZERO FILLED | | |
| 16 | CSSI 1 1760 MONITOR | | |
| 17 | CSSI 2 1760 MONITOR | | |
| 18 | CSSI 3 1760 MONITOR | | |
| 19 | ZERO FILLED | | |
| 20 | ZERO FILLED | | |
| 21 | ZERO FILLED | | |
| 22 | ZERO FILLED | | |
| 23 | ZERO FILLED | | |
| 24 | ZERO FILLED | | |
| 25 | ZERO FILLED | | |
| 26 | INTERRUPTIVE BIT COMMANDED | | |
| 27 | CS/MS DATA TRANSFER MONITOR WORD, | NOTE A | |
| 28 | MSWEM CONFIGURATION MONITOR WORD | | |
| 29 | ZERO FILLED | | |
| LAST | CHECKSUM | | |

NOTES:
A) CSSI ADDRESS AND 1553 BUS CONTROL BIT ONLY

MESSAGE FORMATS

| MESSAGE NAME | MSWEM AUXILIARY COMMAND MESSAGE (MACM) |
|---|---|
| SUBADDRESS | 10 |

| WORD NUMBER | WORD NAME | CONTENT | WORD DESCRIPTION |
|---|---|---|---|
| 0 | COMMAND WORD | RECEIVE | |
| 1 | HEADER | AUXILIARY COMMAND HEADER 0502H | |
| 2 | CMD ID | IDENTIFIES COMMAND(S) CONTAINED WITHIN THIS MESSAGE | |
| 3 | RT-RT RCV CW | RECEIVE CMD WORD WHICH WILL BE PUT OUT ON SUB-BUS | |
| 4 | RT-RT TRNS CW | TRANSMIT CMD WORD WHICH WILL BE PUT OUT ON SUB-BUS | |
| 5 | RT-RT NUMBER | # OF RT-RT TRANS TO BE EXECUTED DURING THIS ROUTINE | |
| 6 | MODE CODE CW | MODE CODE COMMANDS WORD FOR STORE ON SUB-BUS | |
| 7 | MODE CODE DATA | DATA WORD TO ACCOMPANY MODE CODE | |
| 8 | ZERO FILLED | NOTE A | |
| 9 | ZERO FILLED | | |
| 10 | ZERO FILLED | | |
| 11 | ZERO FILLED | | |
| 12 | ZERO FILLED | | |
| 13 | ZERO FILLED | | |
| 14 | ZERO FILLED | | |
| 15 | ZERO FILLED | | |
| 16 | ZERO FILLED | | |
| 17 | ZERO FILLED | | |
| 18 | ZERO FILLED | | |
| 19 | ZERO FILLED | | |
| 20 | ZERO FILLED | | |
| 21 | ZERO FILLED | | |
| 22 | ZERO FILLED | | |
| 23 | ZERO FILLED | | |
| 24 | ZERO FILLED | | |
| 25 | ZERO FILLED | | |
| 26 | ZERO FILLED | | |
| 27 | ZERO FILLED | | |
| 28 | ZERO FILLED | | |
| 29 | ZERO FILLED | | |
| LAST | CHECKSUM | | |

MESSAGE

NOTES:

A) WORDS 7-29 CAN BE USED FOR OTHER FUNCTIONS AS REQUIRED

MESSAGE FORMATS

| | | | |
|---|---|---|---|
| MESSAGE NAME | | MSWEM AUXILIARY COMMAND MONITOR MESSAGE (MACMM) | |
| SUBADDRESS | | 10 | |
| WORD NUMBER | WORD NAME | CONTENT | WORD DESCRIPTION |
| 0 | COMMAND WORD | TRANSMIT | |
| 1 | HEADED | AUXILIARY COMMAND MONITOR (0503) | |
| 2 | CMD ID | COMMAND IDENTIFICATION VERIFY | |
| 3 | RT-RT RCV CW | RECIEVE CMD WORD MONITOR | |
| 4 | RT-RT TRNS CW | TRANSMIT CMD WORD MONITOR | |
| 5 | RT-RT NUMBER | # OF RT-RT TRANSFER LEFT TO BE EXECUTED DURING THIS ROUTINE | |
| 6 | MODE CODE CW | MODE CODE COMMANDS MONITOR | |
| 7 | MODE CODE DATA | MODE CODE DATA MONITOR | |
| 8 | PROTOCOL FLAGS | LOWER BUS PROTOCOL FLAGS | |
| 9 | VECTOR WORD | REQUESTED STORE VECTOR WORD | |
| 10 | ZERO FILLED | | |
| 11 | ZERO FILLED | | |
| 12 | ZERO FILLED | | |
| 13 | ZERO FILLED | | |
| 14 | ZERO FILLED | | |
| 15 | ZERO FILLED | | |
| 16 | ZERO FILLED | | |
| 17 | ZERO FILLED | | |
| 18 | ZERO FILLED | | |
| 19 | ZERO FILLED | | |
| 20 | ZERO FILLED | | |
| 21 | ZERO FILLED | | |
| 22 | ZERO FILLED | | |
| 23 | ZERO FILLED | | |
| 24 | ZERO FILLED | | |
| 25 | ZERO FILLED | | |
| 26 | IBIT ERROR WORD | | |
| 27 | ZERO FILLED | | |
| 28 | ZERO FILLED | | |
| 29 | ZERO FILLED | | |
| LAST | CHECKSUM | | |

MESSAGE NOTES

1) WORDS 10-25 & 28-29 CAN BE USED FOR OTHER FUNCTIONS AS REQUIRED

MESSAGE FORMATS

| | | | |
|---|---|---|---|
| MESSAGE NAME | | MSWEM ID MESSAGE (MIDM) | |
| SUBADDRESS | | 1 | |
| WORD NUMBER | WORD NAME | CONTENT | WORD DESCRIPTION |
| 0 | COMMAND WORD | TRANSMIT | |
| 1 | HEADER | HEADER WORD | |
| 2 | 5553H | ASCII US COUNTRY CODE | |
| 3 | A5B4H | STORE IDENTITY (BINARY) | |
| 4 | 4D53H | STORE IDENTITY (ASCII) MSWEM-07/20/1992 | |
| 5 | 5745H | STORE IDENTITY (ASCII) MSWEM-07/20/1992 | |
| 6 | 4D2DH | STORE IDENTITY (ASCII) MSWEM-07/20/1992 | |
| 7 | 3037H | STORE IDENTITY (ASCII) MSWEM-07/20/1992 | |
| 8 | 2F32H | STORE IDENTITY (ASCII) MSWEM-07/20/1992 | |
| 9 | 302FH | STORE IDENTITY (ASCII) MSWEM-07/20/1992 | |
| 10 | 3139H | STORE IDENTITY (ASCII) MSWEM-07/20/1992 | |
| 11 | 3932H | STORE IDENTITY (ASCII) MSWEM-07/20/1992 | |
| 12 | 0104H | MAX. INTERRUPTIVE BIT TIME (1048576uS) | |
| 13 | 0000H | ZERO FILLED | |
| 14 | 0000H | ZERO FILLED | |
| 15 | 0000H | ZERO FILLED | |
| 16 | 0000H | ZERO FILLED | |
| 17 | 0000H | ZERO FILLED | |
| 18 | 0000H | ZERO FILLED | |
| 19 | 0000H | ZERO FILLED | |
| 20 | 0000H | ZERO FILLED | |
| 21 | 0000H | ZERO FILLED | |
| 22 | 0000H | ZERO FILLED | |
| 23 | 0000H | ZERO FILLED | |
| 24 | 0000H | ZERO FILLED | |
| 25 | 0000H | ZERO FILLED | |
| 26 | 0000H | ZERO FILLED | |
| 27 | 0000H | ZERO FILLED | |
| 28 | 0000H | ZERO FILLED | |
| 29 | 0000H | ZERO FILLED | |
| LAST | 56CDH | CHECKSUM | |

MESSAGE

| BIT TIME | BIT NUMBER | VALIDITY WORD — WORD BIT DESCRIPTION | VALIDITY WORD — WORD BIT DESCRIPTION | CRITICAL CONTROL WORD — WORD BIT DESCRIPTION |
|---|---|---|---|---|
| 1 | | DATA SYNC WAVEFORM | DATA SYNC WAVEFORM | DATA SYNC WAVEFORM |
| 2 | | DATA SYNC WAVEFORM | DATA SYNC WAVEFORM | DATA SYNC WAVEFORM |
| 3 | | DATA SYNC WAVEFORM | DATA SYNC WAVEFORM | DATA SYNC WAVEFORM |
| 4 | 0 | VALIDITY OF ENTITY 1 | VALIDITY OF ENTITY 17 | D10 = SHALL BE SET TO LOGIC 0 |
| 5 | 1 | VALIDITY OF ENTITY 2 | VALIDITY OF ENTITY 18 | D9 = SHALL BE SET TO LOGIC 0 |
| 6 | 2 | VALIDITY OF ENTITY 3 | VALIDITY OF ENTITY 19 | D8 = SHALL BE SET TO LOGIC 0 |
| 7 | 3 | VALIDITY OF ENTITY 4 | VALIDITY OF ENTITY 20 | D7 = SHALL BE SET TO LOGIC 0 |
| 8 | 4 | VALIDITY OF ENTITY 5 | VALIDITY OF ENTITY 21 | D6 = SHALL BE SET TO LOGIC 0 |
| 9 | 5 | VALIDITY OF ENTITY 6 | VALIDITY OF ENTITY 22 | D5 = SHALL BE SET TO LOGIC 0 |
| 10 | 6 | VALIDITY OF ENTITY 7 | VALIDITY OF ENTITY 23 | D4 = INITIATE INTERRUPTIVE BIT |
| 11 | 7 | VALIDITY OF ENTITY 8 | VALIDITY OF ENTITY 24 | D3 = SHALL BE SET TO LOGIC 0 |
| 12 | 8 | VALIDITY OF ENTITY 9 | VALIDITY OF ENTITY 25 | D2* |
| 13 | 9 | VALIDITY OF ENTITY 10 | VALIDITY OF ENTITY 26 | D1*   * SEE NOTE 1 BELOW |
| 14 | 10 | VALIDITY OF ENTITY 11 | VALIDITY OF ENTITY 27 | D0* |
| 15 | 11 | VALIDITY OF ENTITY 12 | VALIDITY OF ENTITY 28 | A4** |
| 16 | 12 | VALIDITY OF ENTITY 13 | VALIDITY OF ENTITY 29 | A3** |
| 17 | 13 | VALIDITY OF ENTITY 14 | | A2**   **SEE NOTE 2 BELOW |
| 18 | 14 | VALIDITY OF ENTITY 15 | | A1** |
| 19 | 15 | VALIDITY OF ENTITY 16 | | A0** |
| 20 | | PARITY | PARITY | PARITY |

TABLE 1 — TABLE 2 — TABLE 3

* NOTE 1

| D2 | D1 | D0 | |
|---|---|---|---|
| 0 | 0 | 0 | RESERVED |
| 0 | 0 | 1 | MISSION STORE |
| 0 | 1 | 0 | CARRAIGE STORE |
| 0 | 1 | 1 | RESERVED |
| THROUGH | | | |
| 1 | 1 | 1 | RESERVED |

| BIT TIME | BIT NUMBER | CRITICAL AUTHORITY WORD — WORD BIT DESCRIPTION | CSSI RACK CONTROL WORD — WORD BIT DESCRIPTION | CSSI RACK MONITOR WORD — WORD BIT DESCRIPTION |
|---|---|---|---|---|
| 1 | | DATA SYNC WAVEFORM | DATA SYNC WAVEFORM | DATA SYNC WAVEFORM |
| 2 | | DATA SYNC WAVEFORM | DATA SYNC WAVEFORM | DATA SYNC WAVEFORM |
| 3 | | DATA SYNC WAVEFORM | DATA SYNC WAVEFORM | DATA SYNC WAVEFORM |
| 4 | 0 | C14=D10+D9+D6+D1+D0 | MASTER ARM (RACK POWER) | MASTER ARM (RACK POWER) PRESENT |
| 5 | 1 | C13=D9+D8+D5+D0 | FIRE CARTRIDGE 2 | |
| 6 | 2 | C12=D8+D7+D4 | FIRE CARTRIDGE 1 | CONNECTOR MATED STATUS |
| 7 | 3 | C11=D7+D6+D3 | SELECT IFOBL OVERRIDE | |
| 8 | 4 | C10=D10+D9+D5+D2+D1+D0 | TAIL ARM | TAIL ARM VOLTAGE PRESENT |
| 9 | 5 | C9=D10+D8+D6+D4 | ACTIVATE IFOBL OVERRIDE | PLUNGER STATUS |
| 10 | 6 | C8=D10+D7+D6+D5+D3+D1+D0 | IFOBL LOCK | IFOBL LOCKED |
| 11 | 7 | C7=D10+D5+D4+D2+D1 | | AFT HOOK STATUS |
| 12 | 8 | C6=D10+D6+D4+D3 | | FRONT HOOK STATUS |
| 13 | 9 | C5=D9+D5+D3+D2 | | INTERUPTIVE BIT FLAG |
| 14 | 10 | C4=D10+D9+D8+D6+D4+D2+D0 | NOSE ARM | NOSE ARM VOLTAGE PRESENT |
| 15 | 11 | C3=D9+D8+D7+D5+D3+D1 | IFOBL UNLOCK | IFOBL UNLOCKED |
| 16 | 12 | C2=D10+D9+D8+D7+D4+D2+D1 | CENTER ARM | CENTER ARM VOLTAGE PRESENT |
| 17 | 13 | C1=D10+D8+D7+D3 | | RELEASE CONSENT PRESENT |
| 18 | 14 | C0=D10+D7+D2+D1+D0 | SELECT CARTRIDGE 2 | CARTRIDGE 2 SELECTED |
| 19 | 15 | RESERVED. SET TO LOGIC 0 | SELECT CARTRIDGE 1 | CARTRIDGE 1 SELECTED |
| 20 | | PARITY | PARITY | PARITY |

TABLE 4 — TABLE 5 — TABLE 6

| BIT TIME | BIT NUMBER | CSSI 1760 CONTROL WORD — WORD BIT DESCRIPTION | CSSI 1760 MONITOR WORD — WORD BIT DESCRIPTION | CS/MS DATA TRANSFER WORD — WORD BIT DESCRIPTION |
|---|---|---|---|---|
| 1 | | DATA SYNC WAVEFORM | DATA SYNC WAVEFORM | DATA SYNC WAVEFORM |
| 2 | | DATA SYNC WAVEFORM | DATA SYNC WAVEFORM | DATA SYNC WAVEFORM |
| 3 | | DATA SYNC WAVEFORM | DATA SYNC WAVEFORM | DATA SYNC WAVEFORM |
| 4 | 0 | SELECT RELEASE CONSENT | RELEASE CONSENT SELECTED | CSSI ADDR BIT 1 |
| 5 | 1 | SELECT 28 VDC 2 | 28 VDC 2 SELECTED | CSSI ADDR BIT 2 |
| 6 | 2 | SELECT 270 VDC | 270 VDC SELECTED | CSSI ADDR BIT 3 |
| 7 | 3 | SELECT 115 VAC PHASE C | 115 VAC PHASE C SELECTED | CSSI ADDR BIT 4 |
| 8 | 4 | SELECT 115 VAC PHASE B | 115 VAC PHASE B SELECTED | CSSI ADDR BIT 5 |
| 9 | 5 | SELECT 115 VAC PHASE A | 115 VAC PHASE A SELECTED | MSWEN RT TO RT'S BRDCST |
| 10 | 6 | SELECT LOW BANDWIDTH | LOW BANDWIDTH SELECTED | NUM OF MESSAGES BIT 1 |
| 11 | 7 | SELECT 28 VDC 1 | 28 VDC 1 SELECTED | NUM OF MESSAGES BIT 2 |
| 12 | 8 | SELECT 115 3 PHASE RELAY | 115 3 PHASE RELAY SELECTED | NUM OF MESSAGES BIT 3 |
| 13 | 9 | SELECT 28 VDC 2 RELAY | 28 VDC 2 RELAY SELECTED | NUM OF MESSAGES BIT 4 |
| 14 | 10 | SELECT 270 VDC RELAY | 270 VDC RELAY SELECTED | NUM OF MESSAGES BIT 5 |
| 15 | 11 | SELECT HBW4 | HBW4 SELECTED | NUM OF MESSAGES BIT 6 |
| 16 | 12 | SELECT HBW3 | HBW3 SELECTED | NUM OF MESSAGES BIT 7 |
| 17 | 13 | SELECT HWB2 | HBW2 SELECTED | NUM OF MESSAGES BIT 8 |
| 18 | 14 | SELECT HBW1 | HBW1 SELECTED | NUM OF MESSAGES BIT 9 |
| 19 | 15 | SELECT 28 VDC 1 RELAY | 28 VDC 1 RELAY SELECTED | NUM OF MESSAGES BIT 10 |
| 20 | | PARITY | PARITY | PARITY |

TABLE 7 — TABLE 8 — TABLE 9

| BIT TIME | BIT NUMBER | MSWEM CONFIGURATION CONTROL WORD<br>WORD BIT DESCRIPTION | MSWEM CONFIGURATION MONITOR WORD<br>WORD BIT DESCRIPTION | VECTOR WORD FORMAT CARRIAGE STORE ERROR<br>WORD BIT DESCRIPTION |
|---|---|---|---|---|
| 1 | | DATA SYNC WAVEFORM | DATA SYNC WAVEFORM | DATA SYNC WAVEFORM |
| 2 | | DATA SYNC WAVEFORM | DATA SYNC WAVEFORM | DATA SYNC WAVEFORM |
| 3 | | DATA SYNC WAVEFORM | DATA SYNC WAVEFORM | DATA SYNC WAVEFORM |
| 4 | 0 | CLEAR MSWEM INITIALIZED BIT | MSWEM INITIALIZED BIT | 0 = CARRIAGE STORE ERROR |
| 5 | 1 | | | TBD |
| 6 | 2 | | | MESSAGE CHECKSUM FAILURE |
| 7 | 3 | | | CRIT CNTRL/AUTH FAILURE |
| 8 | 4 | MSWEM 1553 BUS CNTRL BIT | MSWEM 1553 BUS CNTRL BIT | PVE FAILURE |
| 9 | 5 | | | NO RELEASE CONSENT PRESENT |
| 10 | 6 | PASS BROADCAST MODE CMDS | PASS BROADCAST MODE CMDS | INVALID MESSAGE (HEADER) |
| 11 | 7 | PASS BROADCAST MESSAGES | PASS BROADCAST MESSAGES | TBD |
| 12 | 8 | TBD | TBD | RT TRANSMIT OVERFLOW |
| 13 | 9 | TBD | TBD | BC MESSAGE OVERFLOW |
| 14 | 10 | TBD | TBD | TBD |
| 15 | 11 | TBD | TBD | TBD |
| 16 | 12 | TBD | TBD | TBD |
| 17 | 13 | 28VDC POWER SUPPLY ON | 28VDC POWER SUPPLY ON | TBD |
| 18 | 14 | HBW1 CONTROL 2 | HBW1 CONTROL 2 | TBD |
| 19 | 15 | HBW1 CONTROL 1 | HBW1 CONTROL 1 | TBD |
| 20 | | PARITY | PARITY | PARITY |

TABLE 10  TABLE 11  TABLE 12

| BIT TIME | BIT NUMBER | VECTOR WORD FORMAT MISSION STORE ERROR<br>WORD BIT DESCRIPTION |
|---|---|---|
| 1 | | DATA SYNC WAVEFORM |
| 2 | | DATA SYNC WAVEFORM |
| 3 | | DATA SYNC WAVEFORM |
| 4 | 0 | 1 = MISSION STORE ERROR |
| 5 | 1 | CSSI ADDRESS BIT 5 |
| 6 | 2 | CSSI ADDRESS BIT 4 |
| 7 | 3 | CSSI ADDRESS BIT 3 |
| 8 | 4 | CSSI ADDRESS BIT 2 |
| 9 | 5 | CSSI ADDRESS BIT 1 |
| 10 | 6 | TBD |
| 11 | 7 | TBD |
| 12 | 8 | BROADCAST NOT RECEIVED |
| 13 | 9 | NO CSSI STATUS RESPONSE |
| 14 | 10 | MESSAGE ERROR |
| 15 | 11 | INSTRUMENTATION |
| 16 | 12 | SERVICE REQUEST |
| 17 | 13 | BUSY |
| 18 | 14 | SUBSYSTEM FLAG |
| 19 | 15 | TERMINAL FLAG |
| 20 | | PARITY |

TABLE 13

The MCM is used to control both rack functions and 1760 discrete circuits. Additionally, the MCM is used to control the flow of data to and from the aircraft to stores through the carriage store. In a TER application, words 8, 9 and 10 are used to set the rack functions identified in the CSSI Rack Control Word on and off (1=selected, 0=not selected). Words 16, 17 and 18 are used to select which of the 1760 signals should be turned on to the store assigned to each word. Word twenty-seven (27), the Carriage Store/Mission Store (CS/MS) Data Transfer Message, controls the transfer of data through the MSWEM. Bits one (1) through five (5) contain the RT address of the store that is to be communicated with, (A, B or C) and bits nine (9) through sixteen (16) represent the number messages to be transferred to or from this RT. Once the MSWEM receives a valid MCM with an address and message count (x) in word 27, the MSWEM processor replaces the RT address in the next X number of messages and sends the messages out from the BC on the sub-bus. The ten (10) bits which are reserved for message count will allow for message series of from one (1) to one thousand twenty-three (1,023) messages per MCM. FIGS. 7 and 8 demonstrate how messages are transmitted through the MSWEM in both directions. The SMS can stop a flow of messages to a store before the message count decrements to zero by sending a MCM with the designator bits in the critical control word set to carriage store "010".

Operation of the ten primary MIL-STD-1553 message formats are as follows:

1. BC to RT Transfers (Receive). The aircraft SMS will send an MCM to the MSWEM with the desired Store Terminal Address and Message Count in word twenty-seven (27). The MSWEM will place the RT address and count that was in word twenty-seven (27) in processor memory. The message count is stored in a variable named the Mission Store Message Count (MSMC). The MSWEM will then treat the next MSMC number of messages as messages intended for stores. The SMS will then send MSMC number of messages to the MSWEM. The MSWEM will take the command word received and replace the MSWEM's terminal address with the terminal address from word twenty-seven (27), copy the command and data with the command to the MSWEM BC for retransmission on the sub-bus. The MSWEM will check the status word for errors after the BC has processed each message. For all message formats which involve receive messages to stores on the sub-bus, the last status word from the store must be checked by the SMS. This is done by sending a transmit status word mode code to the MSWEM after the MSWEM has had time to evaluate the last status word from the store. This procedure is required only when no further communication is going to occur with the MSWEM, or if there will be a long delay after the completion of the receive command.

2. RT to BC Transfers (Transmit). The Aircraft SMS will send an MCM to the MSWEM with the desired store terminal address and message count plus one (+1) in word twenty-seven (27). The count must be one more than the number of transmit message because zero filled data will be returned from the MSWEM RT for the first transmit message. A minimum of one millisecond intermessage gap must exist after each transmit command. The SMS will then send the appropriate number of messages to the MSWEM. The MSWEM will respond with data and will echo the command of the sub-bus to the appropriate store.

It is important to remember that in each case where data is to be returned from a store on the sub-bus that one extra transmit message will be required.

3. RT to RT Transfers. There are three (3) variations of this message format:
   a) When the receiving RT is on the MSWEM Store Bus, the Aircraft SMS will send an MCM to the MSWEM with the desired store terminal address and message count in word twenty-seven (27). The SMS will then issue MSMC number of RT to RT commands. The MSWEM will transmit the received messages to the appropriate store on the sub-bus.
   b) When the transmitting RT is on the MSWEM secondary bus, the Aircraft SMS will send an MCM to the MSWEM with the desired Store Terminal Address and MSMC plus one (+1) in word twenty-seven (27). The SMS will then send one standard RT to BC message to begin the data transfer process to get the first messages data up from the store RT to the MSWEM RT. The SMS must ignore the data which is transmitted with this first message. The SMS must then delay one millisecond used, then issue MSMC number of RT to RT commands. There must be a one millisecond delay between each RT to RT command issued by the SMS.
   c) When both transmitting and receiving RT's are on the sub-bus, the SMS will send a MSWEM Auxiliary Command message (MACM) which contains the receive and transmit commands for the sub-bus. The MSWEM will then process the message on the sub-bus.

4. Mode Command without data. There are two (2) variations of this message format:
   a) Mode Command Intended for MSWEM RT. The SMS will send the Mode Code Message normally.
   b) Mode Command Intended for Store on MSWEM. The SMS will send an MACM containing the mode code command word for the store on the sub-bus. The MSWEM will then transmit the mode command on the sub-bus.

5. Mode Command with Data (Transmit). There are two (2) variations of this message format:
   a) Mode Command with Data Intended for MSWEM RT. The SMS will send the Mode Code Message normally.
   b) Mode Command with Data from Store on Sub-bus. The SMS will send an MACM containing mode code command word for the store on the sub-bus. The MSWEM will then transmit the command on the sub-bus. The SMS will then wait one millisecond for the MSWEM to process the mode code and place the monitor message in the MSWEM Auxiliary Command Monitor Message (MACMM) subaddress. The SMS will then issue a MACMM in which the data word will be stored.

6. Mode Command with Data (Receive). There are two (2) variations of this message format:
   a) Mode Command with Data Intended for MSWEM RT. The SMS will send the Mode Code Message normally.
   b) Mode Command with Data for Store on Sub-bus. The SMS will send a MACM containing the mode code command word and data word to be transmitted on the sub-bus. The MSWEM will then transmit the message on the sub-bus.

7. Broadcast BC to RT's Transfer. The SMS will send a Broadcast Message normally. The MSWEM will receive the message, then rebroadcast it on the sub-bus. This function can be disabled by setting bit 7 in the MSWEM configuration word to 0.

8. Broadcast RT to RT's Transfer. There are two (2) variations of this message format.
   a) Transmitting RT in the Aircraft. The SMS will send a Broadcast Message normally, the MSWEM will receive and then rebroadcast the Message on Stores Bus. This function can be disabled as discussed above.
   b) Transmitting RT on the MSWEM. This message format is very similar to handling commands from one RT to other RT's when the transmitting RT is on the sub-bus. The only difference is that bit five (5) in word twenty-seven (27) of the MCM will be sent on to indicate that this is a broadcast message from one RT to other RT's with the transmitting RT on the sub-bus.

9. Broadcast Mode Command without Data. The SMS will send a Broadcast Message normally, the MSWEM will receive and then rebroadcast the message on the sub-bus. This function can be disable by setting bit 6 in the MSWEM configuration word to 0.

10. Broadcast Mode Command with Data. The SMS will send a broadcast message normally, the MSWEM will receive and then rebroadcast the message on the sub-bus. This function can be disabled as discussed above.

SIGNAL TRANSMISSION

As described above, the present invention receives the MIL-STD-1760 High Bandwidth (HBW) 1 signal from the Carriage Store Interface of a TER-9A and distributes that signal to (A, B or C) Carriage Store Station Interfaces. MIL-STD-1760 HBW 1 is capable of transmitting Type A and Type B signals. Type A signals fall within the 20 Hz to 20 MHz band and typically are used for composite video. Type B signals fall within the 20 MHz to 1.6 GHz band and are low power level radio frequencies, such as receiver inputs (Global Positioning System (GPS) Data). Incorporating HBW 1 into the TER requires that the HBW signal received at the Carriage Store Interface (CSI) be transmitted down to any one or simultaneously to any combination of the three Carriage Store Station Interfaces (CSSI). The signal received at the CSSI's must meet the minimum requirements of MIL-STD-1760.

The following electrical requirements pertain to the High Bandwidth 1 signal:

| TYPE A SIGNALS | |
|---|---|
| Signal Frequency: | 20 Hz to 20 MHz |
| Full Scale Signal Voltage: | 1.0 volt, peak to peak, min. |
| | 12.0 V, peak to peak, max. |
| Signal Voltage Dynamic Range: | 30 dB |
| Maximum Power: | 300 milliwatts |
| Characteristic Impedance: | 50 ohms |
| VSWR: | 2.0:1 MAX. |
| TYPE B SIGNALS | |
| Signal Frequency: | 20 MHz to 1600 MHz |
| Full Scale Signal Voltage: | .01 microvolt, peak to peak, min.; 1.0 V, peak to peak, max. |
| Signal Voltage Dynamic Range: | 30 dB |
| Maximum Power: | +10 dBm |
| Characteristic Impedance: | 50 ohms |
| VSWR: | 2.0:1 MAX. |

Figure 10:
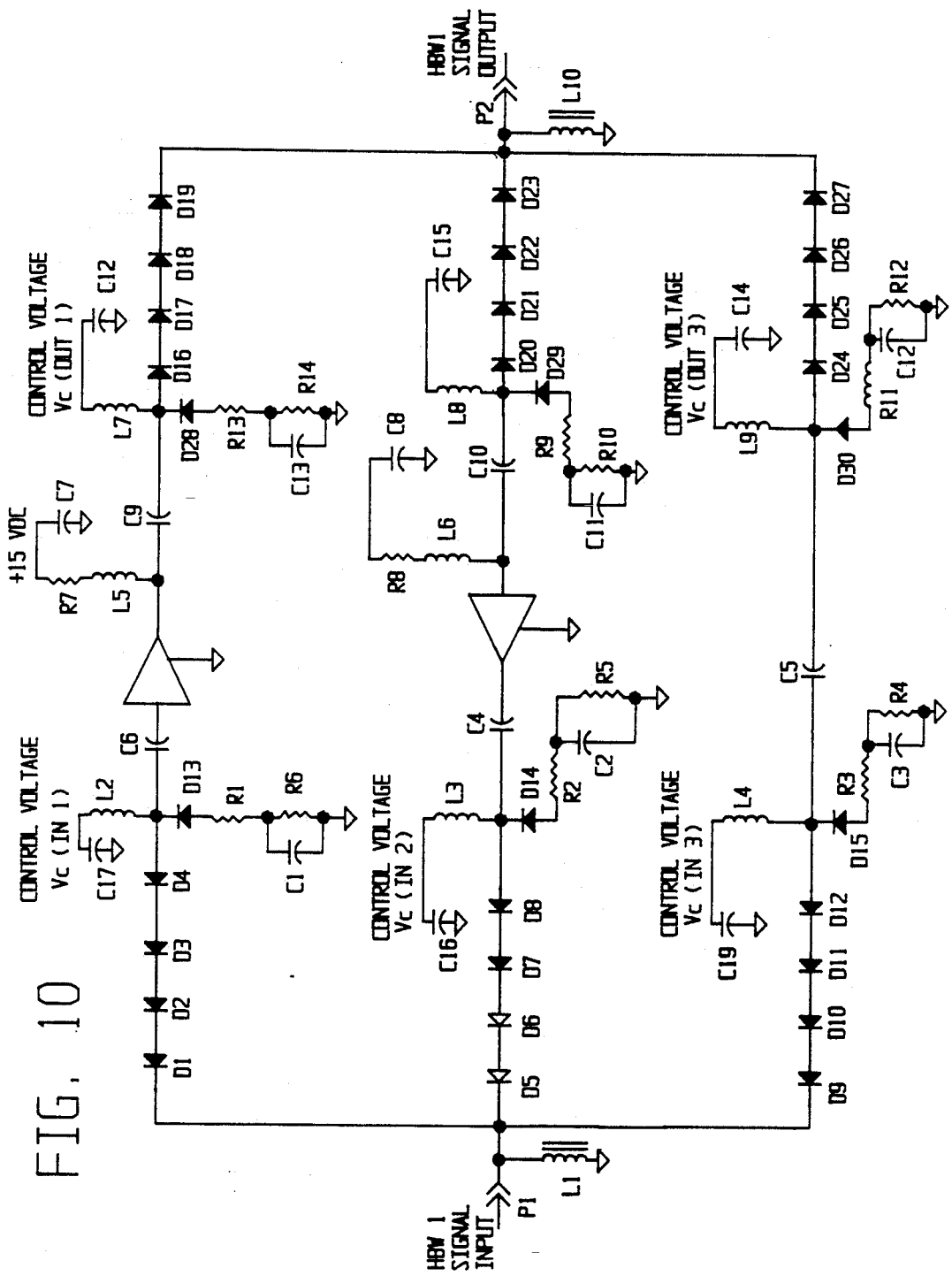
FIG. 10 is a schematic circuit diagram employed by the circuit diagram for the transmission of high bandwidth signals employed by the present invention.

The present invention is capable of incorporating HBW 1 into the TER to provide separate signal paths for different frequencies. The schematic of the High Bandwidth 1 circuit is shown in FIG. 10. This circuit shows three paths for HBW 1 signals; Type A signals, GPS Type B signals and non-GPS Type B signals. This circuit will also terminate the CSI signal input at 50-ohms impedance if no path is selected. Detailed descriptions of the three paths are as follows.

The Type A signals (Video) are handled through relay switches. These relays will allow the signal to be directed, via MIL-STD-1553 messages, to CSSI 1, 2, and/or 3. If only one CSSI is selected, the circuit will meet all the electrical requirements of MIL-STD-1760. However, since the signal is capable of being sent to more than one CSSI at a time, the signal strength will be degraded if more than one CSSI is selected.

It should be noted that if simultaneous transmission of Type A signals becomes a requirement, an amplifier could be added to meet this need.

The higher frequency Type B signals are used for transmitting GPS data. Applicants believe that there is a requirement to send GPS data to multiple CSSI's of the TER simultaneously. There are two GPS specific frequencies, 1227.6 MHz and 1575.42 MHz. The applicants have chosen to optimize the Type B circuit for GPS data transmission, since that is the primary utilization of Type B signals. Consequently, simultaneous transmission of GPS data to multiple CSSI's requires an amplifier to be incorporated into the circuit. The amplifier chosen covers the bandwidth from 1.2 GHz to 1.6 GHz and therefore covers the two GPS frequencies. This amplifier allows for the simultaneous transmission of data to multiple CSSI's. Consequently, the amplifiers in this frequency range will not cover the Type B signals between 20 MHz and 1.2 GHz. Therefore, a secondary path has been incorporated. This second path would be for non-GPS data transmission (between 20 MHz and 1.2 GHz) and would be controlled in the same manner as the Type A signals, and consequently experience the same signal loss if multiple CSSI's are selected.

Figure 11:
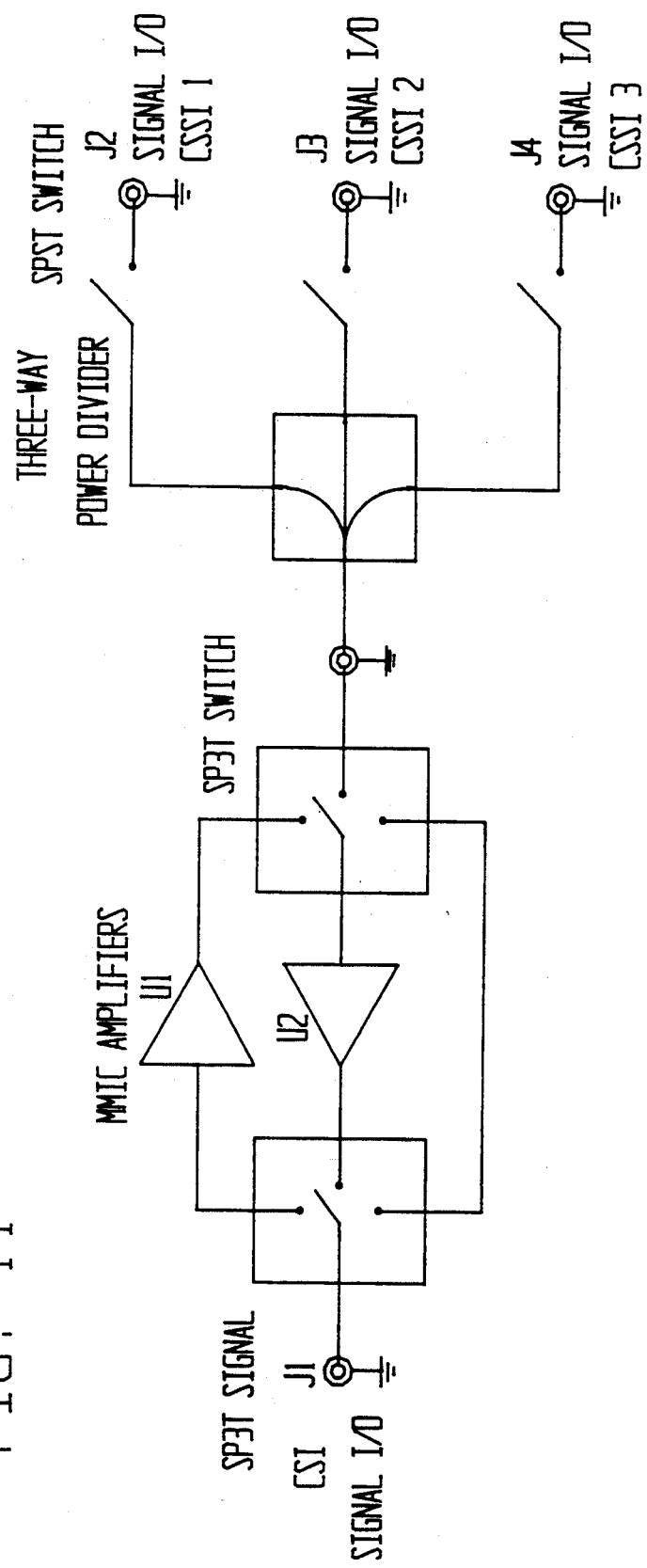
FIG. 11 is a block diagram of the Global Position System (GPS) signal switches.

Referring to FIG. 11, a block diagram of the Bi-Directional Amplified Switch explains the GPS switch's operation. The bi-directional amplified switch is comprised of three major components: the input and output single-pole three-throw switches, the three-way power divider and series switches, and the amplifiers located between the SP3T switches. The operation of this circuit is as follows: GPS signal information is passed from the CSI to CSSI's 1, 2 and 3, as well as in the reverse direction from CSSI's 1, 2, and 3 to the CSI. However, the GPS signal to the stores must be available at all three CSSI's simultaneously, if so required. In order for the signal to be available at all three CSSI's simultaneously, the signal must be divided prior to being delivered to the CSSI's. Dividing the signal in this way decreases the signal power that will be available at the final outputs. The relationship describing the signal power levels between the input and the output of the three-way power divider is as follows:

P1 = Power at input of power divider.
P2, P3, P4 = Power at each output of power divider.
P2 = P3 = P4 = 1/3(P1)

The resultant power output at each of the three output CSSI's will be reduced by approximately 6 dB with respect to the CSI. In order to maintain the proper power levels at the CSSI's at all times, a gain stage is necessary to boost the signal power to the correct levels. The amplifiers selected to boost the power are Monolithic Microwave Integrated Circuit, (MMIC), amplifiers, with a typical gain of +8 dB. MMIC amplifiers have an established reliability record and will perform optimally in the described circuit. The amplifiers require an external bias resistor and RF choke to establish an operating point, as well as bypass and coupling capacitors to isolate and DC block the amplifier from the rest of the circuit in which the amplifier will be connected. The amplifiers operate from a +15 VDC power supply and will require 50 mA of operating current. The amplifiers are internally matched to 50 ohms impedance at the input and output, therefore, no impedance matching techniques are required when the amplifier is connected in the circuit. The package size of the amplifiers is relatively small, requiring approximately 0.160 square inches of printed circuit board area for solder attachment.

By positioning the amplifiers between the two SP3T switches and prior to the three-way power divider and series switches, the correct signal power level can be obtained such that when the signal power is dropped as a result of the power divider, the final output power will be approximately the same as that at the CSI input, J1. The second amplifier, U2 in FIG. 11, is included to provide the proper power gain needed to boost the signal that is received from any one of the CSSI's (J2, J3, or J4, in this case used as inputs when the circuit is used as part of a receiver). When a GPS signal is received and processed through the three-way power divider, the signal will experience some attenuation as explained above. Therefore, to maintain signal integrity and to ensure that there is no loss of information in the GPS signal carrier, the MMIC amplifier gain stage will restore the signal to its proper power level at the CSI.

The SP3T switches are comprised of PIN diodes to perform the switching function necessary to route the GPS signal. PIN diodes demonstrate low series resistance when biased with the proper forward current and low series capacitance when the proper reverse voltage is applied.

Therefore, as described above, incorporating the HBW 1 signal within a TER allows for the simultaneous transmission of signals to multiple CSSI's. However, only signals in the 1.2 GHz to 1.6 GHz range will be amplified to compensate for signal power loss associated with signal division. This range is amplified, since the primary need between the aircraft and the store is to transmit low level GPS RF signals which fall within this range. If required, additional amplifiers could be incorporated into the design, but will add to the system's cost and complexity.

POWER CONVERSION AND DISTRIBUTION

Referring now to FIG. 12, a diagram of the MSWEM power distribution system is shown. The present invention supplies 28 VDC 1 simultaneously to the multiple stores mounted on the MSWEM. This is achieved by converting a portion of the 115-volt 400 Hz aircraft power by the power conversion circuits shown in FIG. 12. This converter will supply 30 amperes of 28-volt DC; 10 amperes to each of the three weapons on the MSWEM. The 28-volt outputs from this converter meet the output requirements of MIL-STD-1760 and utilizes a high frequency pulse-width modulated power converter which is extremely compact and lightweight. The particular circuitry is designed to simply rectify the 3-phase power and use a push-pull or bridge converter to transform the voltage down to the desired output level. This system has no regulation and depends primarily on the stability of the 115-volt, 3-phase input to determine characteristics of the output. As can be seen in FIG. 14, each of the rack arming and fire circuits operate on the required 28-volt DC, while each of the carriage store station interfaces is powered by both 115 VAC and 28 VDC as required.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A digital communications armament network adaptor for carrying multiple smart weapons on a single wing pylon station of an aircraft, comprising:
   an aircraft having a weapons controller configured in compliance with MIL-STD 1553;
   multiple wing-mounted pylons on said aircraft, each providing a weapons station with communications and ejection and release mechanisms electrically connected to said controller for the airborne launch of smart weapons;
   a multiple ejector rack affixed to at least one pylon, said rack holding a plurality of smart weapons; and
   an electronic digital network connected between the controller and said rack-mounted smart weapons, said network located in said rack and including circuitry which receives coded digital communications from said controller and selectively rebroadcasts said communications to one of said smart weapons on said rack designated by said coded communications, thereby controlling all required functions of said designated smart weapon.

2. The multiple armament network of claim 1, further described in that said microprocessor receives signals from said weapons and selectively rebroadcasts them to said controller.

3. The multiple armament network of claim 2, wherein said controller further includes an operational flight program having a network control message to control the flow of data to and from a designated smart weapon through a carriage store station interface located on the multiple ejector rack.

4. The multiple armament network of claim 3, wherein said network circuitry comprises three major components:
   a remote terminal which communicates with the aircraft over the aircraft bus, and a bus controller which communicates with the stores over the store bus;
   a processor, including a central processor unit and address decode control logic to control MIL-STD-1553 communications between the remote terminal and the bus controller; and
   an input/output stage which is controlled via aircraft bus communications to the remote terminal which is acted upon by the processor to control discrete functions of the rack and weapons.

5. The multiple armament network of claim 4, wherein said processor is a microprocessor which executes a preprogrammed routine developed in assembly language.

6. The multiple armament network of claim 5, wherein all communications from the aircraft controller to the electronic digital network and from the electronic digital network to the smart weapons are compliant with MIL-STD-1553 and MIL-STD-1760.

7. The multiple armament network of claim 6, wherein messages received from the aircraft controller are translated into assembly language and deciphered to either operate input/output functions or to be reconfigured into MIL-STD-1553 messages between the bus controller and the stores, or between the remote terminal and the aircraft.

8. The multiple armament network of claim 7, further including a power conversion and distribution system connected to the aircraft 115 VAC power supply to provide 28 VDC power to all smart weapons simultaneously.

9. The multiple armament network of claim 8, wherein data signals are transmitted over high bandwidth frequencies which are amplified to provide sufficient data signal strength and data transfer to said smart weapons simultaneously.

10. The multiple armament network of claim 9, further described in that said power conversion is achieved by a high frequency pulse width modulated power converter.

11. The multiple armament network of claim 9, wherein said processor is an Intel 80286(®).

* * * * *